Feb. 24, 1948.  L. F. POLK ET AL  2,436,528
SCREW THREAD GAUGE
Filed Nov. 10, 1944  2 Sheets-Sheet 1
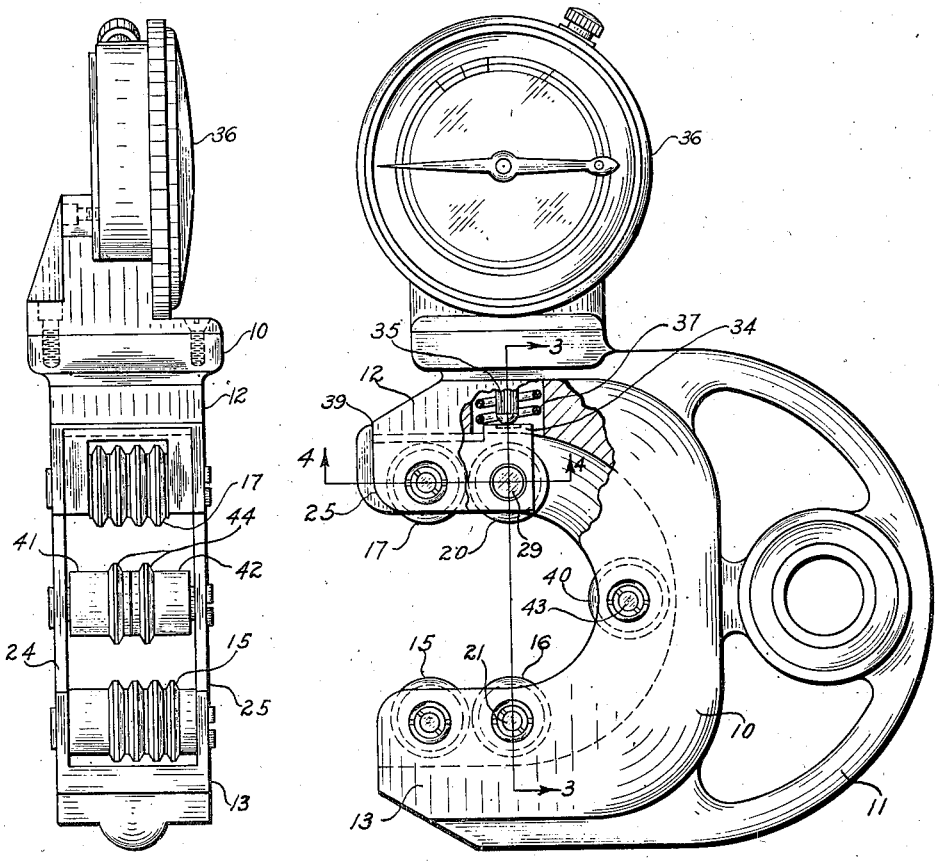
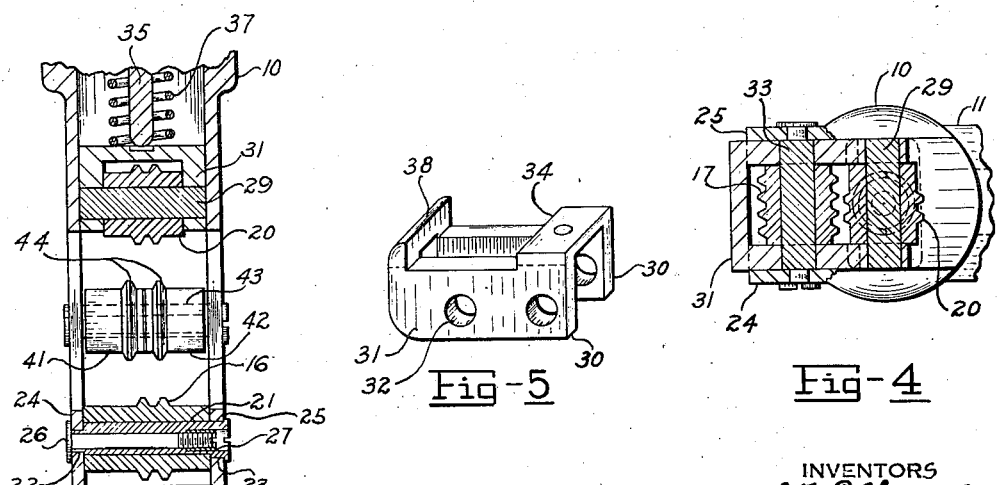
INVENTORS
L. F. Polk and
W. F. Aller
BY
Edward J. Noe
ATTORNEY

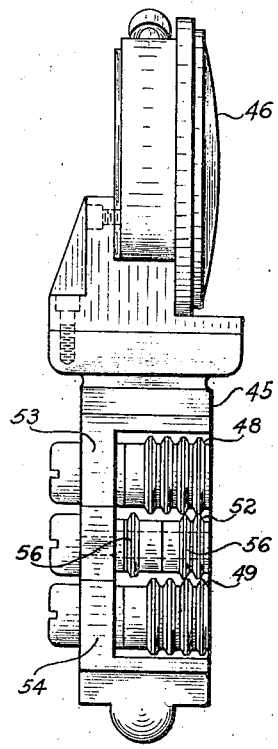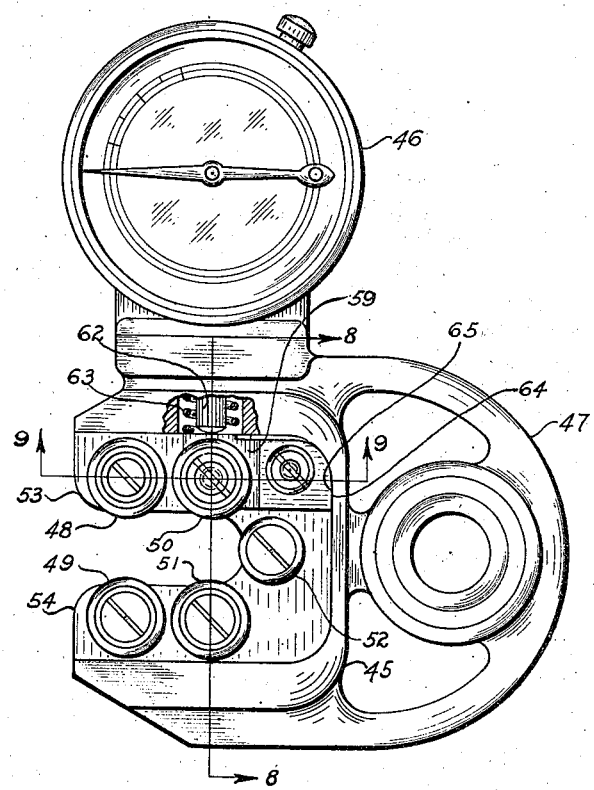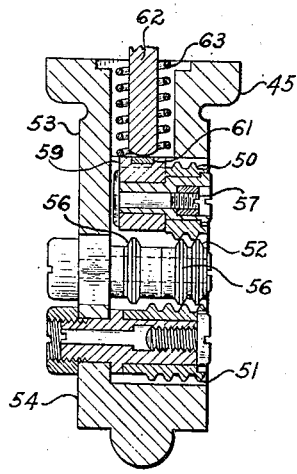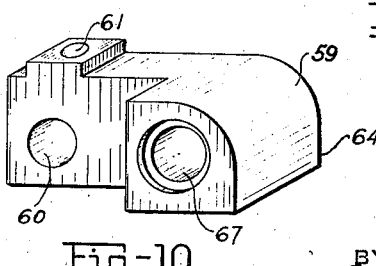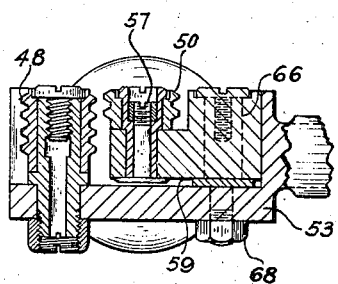

Patented Feb. 24, 1948

2,436,528

UNITED STATES PATENT OFFICE 2,436,528

SCREW THREAD GAUGE

Louis F. Polk and Willis Fay Aller, Dayton, Ohio, assignors to The Sheffield Corporation, Dayton, Ohio, a corporation of Ohio Application November 10, 1944, Serial No. 562,778

2 Claims. (Cl. 33—199)

This invention relates to thread gauges and more particularly to gauges for accurately determining the pitch diameter of screw threads.

One object of the invention is the provision of a thread gauge having provision for conveniently positioning and accurately gauging the pitch diameter of the threads of a workpiece, the gauge being of compact construction and incorporating rotatable rolls or anvils engageable with the workpiece threads.

Another object is the provision of a gauge having a set of rotatable rolls for checking thread lead and arranged as go members to pass threads that are not excessively large in pitch diameter or with excessive lead error, and also incorporating a movable ribbed roll operating an indicator for accurately indicating the pitch diameter of threads that have passed the go members.

Another object is the provision of a gauge of the character mentioned in which the movable pitch measuring roll is carried by a pivot block supported for pivotal movement on a carrying frame and arranged to operate the indicator.

Another object is the provision of a thread checking gauge having spaced thread gauging anvils and provided with a rotatable backstop so positioned as to properly locate the work center with respect to the centers of the gauging anvils, the backstop being freely rotatable as the work is rotated between the gauging anvils.

Another object is the provision of a gauge having spaced ribbed rotatable anvils that are relatively movable and an indicator operated thereby, for gauging pitch diameter, and a set of rotatable ribbed rolls or anvils, relatively fixed, and arranged ahead of the pitch diameter gauging anvils and preventing the passage of threads that have an excessive lead error or an excessive pitch diameter, these several anvils being so co-ordinated with a rotatable backstop roll that a workpiece having the maximum pitch diameter that can pass the go anvils has its axis arranged in the plane that contains the axes of the two pitch diameter gauging anvils. All of the threads that can pass the go rolls will thus be arranged by the backstop roll so that their centers lie in a zone limited by the plane containing the axes of the pitch diameter gauging rolls.

Other objects and advantages of the invention will be apparent from the following description, the appended claims, and the accompanying drawing, in which, Fig. 1 is a front elevation of a gauge embodying the present invention, a portion being shown in section;

Fig. 2 is a side elevation of the gauge shown in Fig. 1;

Fig. 3 is a vertical section on the line 3—3 of Fig. 1;

Fig. 4 is a horizontal section on the line 4—4 of Fig. 1;

Fig. 5 is a perspective view of the pivot block;

Fig. 6 is a front elevation of a modified construction in which the gauging rolls are supported at only one end to permit the workpiece to be gauged close to a shoulder;

Fig. 7 is a side view of the gauge shown in Fig. 6;

Fig. 8 is a vertical section on the line 8—8 of Fig. 6;

Fig. 9 is a section on the line 9—9 of Fig. 6;

Fig. 10 is a perspective view of the pivot block used in the construction shown in Fig. 6; and Fig. 11 is a view of a backstop roll of cylindrical form which may be used instead of the ribbed roll backstop.

Referring more particularly to the drawing, in which the same reference numerals have been applied to like parts in the several views, 10 generally designates a support or frame which, in the form illustrated for exemplary purposes is of a readily portable character so that it may be held in one hand of the user, a handle portion 11 being provided so that it may be readily grasped and applied to the work or by which it may be fixed on a suitable base. The frame is provided with upper and lower arms 12 and 13, spaced apart and projecting from the body portion of the frame as will be apparent from Fig. 1. The lower arm 13 is provided with two lower anvils 15 and 16. The anvil 15 is a rotatable member having a series of ribs that fit the side faces of the threads of the workpiece, the axis of this member being adjustably fixed in the frame and properly located with respect to an opposed gauging anvil 17 which is also provided with a series of ribs and which is also rotatably mounted for movement about an axis that is located in the upper arm 12. These two anvils 15 and 17 in the particular form illustrated have a series of annular ribs and constitute go members affected by errors in thread lead and permitting a workpiece that is small enough to enter a nut of standard size to pass between them but preventing the passage of a threaded part in which the lead is too great or too small to satisfy the required standard. If the pitch diameter of the workpiece thread is excessive, these go members will also prevent the workpiece from passing.

Adjacent the lead checking member 17 is a rotatable annularly ribbed anvil or roll 20 opposed to the anvil 16. Where, as in the case illustrated the anvils 20 and 16 are each of integral form, both of these anvils 16 and 20 have only a few annular ribs so that they can gauge pitch diameter irrespective of lead. As shown in Fig. 3, there are only two annular ribs on each of these two anvils. The anvil 16 is mounted for free rotation on a shaft 21 which is provided with eccentric bearing portions 22 and 23 at its ends. These eccentric bearing portions are located in holes in the side wall portions 24 and 25 of the frame. A threaded stud 26 passes through the shaft 21 and engages a nut 27 arranged inside of the hollow end of the shaft to secure the latter in fixed position but permitting it to be turned and eccentrically adjust the position of the roll or anvil 16. The roll 15 is similarly mounted on an eccentric adjustment to permit variation in the distance between its axis and the anvil 17.

The anvil 20 is arranged for relatively bodily movement towards and from the anvil 16. As shown, it is rotatably supported on a shaft 29 fixed at its opposite ends in spaced walls 30 of a pivot block 31 illustrated in Fig. 5. Free rotational movements of the anvil 20 are thus permitted, and the pivot block supports the anvil for bodily movement towards and from the lower anvil 16. The pivot block is provided with holes 32 which receive a pivot stud 33, the ends of the pivot stud projecting outwardly and being supported in the side walls 24 and 25 of the frame 10. The ends of the pivot stud 33 have a close fit in the side walls 24 and 25 but free pivotal movements of the pivot block can take place, and free rotational movements of the roll or anvil 17 on the stud 33 are provided for. The same pivot stud thus forms a mounting for the anvil 17 and a pivotal support or fulcrum for the pivot block which provides for up and down movement of the roll 20. A cross strip 34 connects the spaced walls 30 of the pivot block above the location of the roll 20, in a position to engage the plunger 35 of an indicator 36 which is supported on the frame 10. A spring 37 engages a shoulder portion of the frame at its upper end and presses downwardly against the cross strip 34 of the pivot block and thus yieldingly holds the roll 20 in a lower limiting position. Suitable spring means are provided preferably as a part of the the indicator for yieldingly holding the plunger 35 down against the cross strip 34. The lower position of the pivot block is determined by a stop arm 38 integral with the side walls 30 and engaging a shoulder 39 on the front of the frame 10 as indicated in Fig. 1.

Arranged between the upper and lower gauging rolls and between the side walls 24 and 25 of the frame is a rotatable back stop 40. This back stop is a roll or a plurality of roll sections 41—42, freely rotatable on a cylindrical stem 43 the ends of which are arranged eccentric to the body portion of the stem and adapted to be adjustably fixed in the spaced side walls 24 and 25. By turning the stem 43 the roll sections may be moved slightly towards or from the plane containing the axes of the rolls 20 and 16. The two roll sections 41 and 42 have a small clearance between their ends so they may be axially movable to a limited extent, and each of these rolls may be provided with a single annular rib 44 adapted to fit the working faces of the threads of the workpieces to be gauged. These ribs 44 may be rather closely positioned for engagement with a short thread, or by reversing one or both of the roll sections end for end the ribs may be rather widely spaced apart for engagement with long threads. The distance between the centers of the roll sections 41—42 with respect to the centers of the rolls 16 and 20 is such that a workpiece of the desired size will be positioned so that its central axis is properly arranged between the axes of the rolls 16 and 20 with the axis of the workpiece in true parallelism with the axes of the ribbed anvils. Thus the workpiece may be conveniently rotated while in engagement with the back stop and while rotating the back stop itself, to determine the pitch diameter of the workpiece in various diametrical planes. As the work rotates, it rotates the backstop and thus prevents wear of the back stop by the work. Furthermore, the ribs 44 on the back stop serve to locate the work axis in a proper position with respect to the plane containing the longitudinal axes of the rolls 20 and 16 so that the operator is not required to feel for the maximum reading on the indicator. Where the back stop roll is ribbed for engaging the threads at the pitch line, the axis of the back stop is so located that a workpiece having the greatest pitch diameter that can pass the go anvils is arranged in the plane containing the axes of anvils 16 and 20, and workpiece threads of smaller pitch diameter would have their axes positioned slightly closer to the back stop roll.

The spacing between the go rolls 15 and 17 may be adjusted by eccentrically adjusting the pivot of the lower roll to position them far enough apart that pieces that are not of excessive pitch diameter or with excessive lead error in the desired tolerance range will pass between these two rolls. The workpiece is then engaged with the rolls 16 and 20, being brought against the rotatable back stop which locates the workpiece properly. During this operation the upper roll 20 is moved upwardly by the work and the pivot block is tilted, moving the indicator plunger 35 upwardly and thus producing an indication on the dial of the indicator 36. This indication shows the pitch diameter of the part. The indicator dial may be calibrated against a plurality of master workpieces one of which is slightly oversize while the other is slightly undersize to give a range of indications within the acceptable limits. The indicator dial is preferably marked to show only the amount of undersize in the pitch diameter instead of showing both plus and minus indications. The readings are thus simplified. Oversize pitch diameters need not be shown, since workpieces in which the diameter is oversize will not pass between the first pair of rolls.

The anvils 16 and 20 and the indicator show whether or not the pitch diameter is large enough to avoid undue looseness of the thread checked and if there are errors of lead present in a part meeting pitch diameter requirements, the part would not be passed by the go anvils 15 and 17. Those parts that give an indication of pitch diameter within the required limits will therefore be free of excessive lead errors and large errors in pitch diameter.

As will be apparent, the thread can be checked at different points along its length to determine taper merely by successive placements in engagement with the gauging anvils.

In accordance with the modified construction illustrated in Figs. 6 to 11, the frame 45 is provided with an indicator 46, a handle 47 and a set of lead or pitch measuring rolls 48 and 49 between which a workpiece of the desired size may pass. A pair of pitch measuring rolls 50 and 51 are provided, and a rotatable back stop 52 is arranged in the space between the latter two rolls. The construction of the parts is generally similar to that illustrated in Figs. 1 to 5, except that the rolls and the back stop are supported at only one end in the projecting side walls 53 and 54 both of which are arranged on the same side of the body member so that the other side of the body member is not restricted and a workpiece may be checked close to a shoulder. The rolls 48 and 49 are provided with annular ribs which extend out substantially to the free ends of the rolls, and the rolls are supported on eccentric mountings or pivot studs as illustrated in Figs. 8 and 9. The back stop in this arrangement as well as in the form of construction first described may be a plain cylindrical roll for engaging the outside of the threads of the workpiece, such a roll being illustrated in Fig. 11, or it could be arranged as illustrated in Figs. 7 and 8, so as to be constituted of a plurality of shorter rolls arranged end to end and each having an annular rib 56. As shown there may be three of these roll sections each with a rib and so arranged that by end for end reversal the ribs may be close together or far apart as desired. An eccentrically adjustable stud as a mounting for the rotatable back stop provides slight variation in the location of the back stop axis with respect to a common plane containing the axes of the rolls 50 and 51.

In this construction the roll 50 is provided with only two annular ribs as illustrated in Fig. 8, arranged near its free ends. An eccentrically adjustable pin 57 forms a support that permits free rotation of the roll 50 and an eccentric adjustment in its position with respect to the roll 51. The end of the pin 57 is mounted in a pivot block 59 which has a hole 60 receiving the pin 57. A bearing surface 61 on the pivot block engages the stem or plunger 62 of the indicator, and a spring 63 holds the pivot block down so that it can be raised by the work. The lowest position of the roll 50 is determined by a shoulder 64 on the block which engages against a shoulder 65 on the frame, see Fig. 6. In this form of construction the pivot block is carried for pivotal movement about an axis spaced from the axis of the roll 48 and arranged closer to the handle 47 than in the form of construction first described. A pivot pin 66 passes through an opening 67 in the pivot block, an end of the pivot pin projecting through an opening in the side wall 53 and being engaged by a holding nut 68. This pin 66 permits free movement of the block about a definite axis.

In accordance with this construction, a workpiece may be first applied to gauging rolls 48 and 49, which have a multiple number of ribs, and which are spaced far enough apart to permit the passage of a workpiece that is small enough to enter a nut of a desired size, these two rolls thus constituting go members. Even if the pitch diameter is small enough these rolls will prevent the passage of workpieces in which the lead error is great enough to call for a rejection of the part. However, if the part satisfactorily passes between these two rolls, it is then brought back against the back stop, and as it enters between the rolls 50 and 51 it forces the roll 50 upwardly, the pivot block swinging around its fulcrum axis at 66 and causing a movement of the indicator plunger 62, thus giving an indication on the dial as to the exact pitch diameter of the part, without being affected by errors in lead. Knowing that the part is small enough to pass the go rolls 48 and 49, one can then determine readily whether or not the pitch diameter of the part is large enough to satisfy any given requirement. The backstop holds the workpiece axis is in proper position, locating the workpiece directly between the two rolls 50 and 51, and by rotating the workpiece while holding it against the back stop, one can readily determine the pitch diameter of the workpiece in different radial planes.

Where the cylindrical rotatable back stop roll 70 shown in Fig. 11 is employed, it is preferably of such diameter and so located that it positions a thread of the proper outside diameter and of the greatest pitch diameter that can pass the set of go rolls so that the thread axis is directly between the pitch diameter gauging rolls. All threads that can pass the go anvils will therefore be held by the back stop so the thread centers lie in a zone limited by the plane through the centers of the pitch diameter gauging anvils and a part that is excessively undersize in pitch diameter will not be inadvertently accepted even though an error in outside diameter may cause the positioning by the back stop too far to one side of the geometric plane through the centers of the pitch diameter gauging anvils.

While the forms of apparatus herein described constitute preferred embodiments of the invention, it is to be understood that the invention is not limited to these precise forms of apparatus, and that changes may be made therein without departing from the scope of the invention which is defined in the appended claims.

What is claimed is:

1. A gauge for checking threads comprising a support, an annularly ribbed rotatable anvil mounted on said support, a second annularly ribbed anvil, a pivot block in which said second anvil is rotatably mounted, said anvils being arranged in opposed relation and having only a few ribs for gauging pitch diameter, a set of rotatable anvils having more than two thread engaging ribs for checking thread lead, one of the anvils of said set being arranged adjacent said second anvil on a shaft which constitutes a pivotal support for said block whereby said block is movable to bodily move said second anvil towards and from said first anvil, and an indicator having an operating member engaged and moved by said block.

2. A gauge for checking threads comprising a support, an annularly ribbed rotatable anvil mounted on said support, a second annularly ribbed anvil, a pivot block in which said second anvil is rotatably mounted, said anvils being arranged in opposed relation and having only a few ribs for gauging pitch diameter, a set of rotatable anvils with a relatively fixed spacing arranged immediately in front of the two first named anvils to prevent passage of a workpiece which has either an excessive lead error or an excessive pitch diameter, the anvils of said set having more than two thread engaging ribs, one of the anvils of said set being arranged adjacent said second anvil on a shaft which constitutes a pivotal support for said block whereby said block is movable to bodily move said second anvil towards and from said first anvil, a backstop roll, and means rotatably supporting said back stop roll for free movement about an axis so arranged on said support that the backstop roll definitely locates the central axis of any workpiece small enough to pass said set of lead checking anvils in a zone limited by a geometric plane through the centers of said first mentioned two anvils.

LOUIS F. POLK.
WILLIS FAY ALLER.

REFERENCES CITED

The following references are of record in the file of this patent:

UNITED STATES PATENTS

| Number | Name | Date |
|---|---|---|
| 454,516 | Brown | June 23, 1891 |
| 1,090,180 | Wells et al. | Mar. 17, 1914 |
| 1,353,608 | Parker | Sept. 21, 1920 |
| 1,593,753 | Darlington | July 27, 1926 |
| 1,851,283 | Johnson | Mar. 29, 1932 |
| 2,027,217 | Zerkle | Jan. 7, 1936 |

FOREIGN PATENTS

| Number | Country | Date |
|---|---|---|
| 270,895 | Great Britain | May 19, 1927 |